United States Patent
Weber

(10) Patent No.: US 6,609,350 B1
(45) Date of Patent: Aug. 26, 2003

(54) LAMINATED GLASS PANEL

(76) Inventor: Paul J. Weber, 1528 First Ave., York, PA (US) 17403

(*) Notice: Subject to any disclaimer, the term of this patent is extended or adjusted under 35 U.S.C. 154(b) by 0 days.

(21) Appl. No.: 09/561,418

(22) Filed: Apr. 28, 2000

(51) Int. Cl.[7] .................................................. E06B 3/54
(52) U.S. Cl. .................. 52/784.1; 52/786.1; 52/786.11
(58) Field of Search ........................ 52/784.1, 786.1, 52/786.11, 786.13

(56) References Cited

U.S. PATENT DOCUMENTS

| | | | | |
|---|---|---|---|---|
| 2,351,991 A | * | 6/1944 | McClain ...................... 52/208 |
| 2,356,878 A | * | 8/1944 | Painter ....................... 156/101 |
| 2,359,163 A | | 9/1944 | Sherts ........................... 20/40 |
| 2,398,886 A | * | 4/1946 | Drake et al. .................. 52/208 |
| 2,409,808 A | * | 10/1946 | Sowle .................... 52/204.595 |
| 2,641,341 A | | 6/1953 | Touvay ........................ 189/77 |
| 2,758,042 A | | 8/1956 | Raymond et al. .......... 154/2.71 |
| 3,358,409 A | | 12/1967 | MacKay ...................... 52/208 |
| 3,679,527 A | * | 7/1972 | Crick .......................... 428/101 |
| 4,232,496 A | * | 11/1980 | Warkentin ..................... 16/2.1 |
| 4,452,022 A | | 6/1984 | Bezborodko .................. 52/311 |
| 4,680,206 A | * | 7/1987 | Yoxon et al. ............... 156/109 |
| 4,724,638 A | | 2/1988 | Bezborodko .................. 52/311 |
| 4,893,443 A | * | 1/1990 | Haber .................... 52/204.593 |
| 4,933,227 A | * | 6/1990 | Stewart ...................... 156/102 |
| 5,704,173 A | | 1/1998 | Repp et al. .............. 52/204.62 |
| 6,138,434 A | * | 10/2000 | Demars et al. ............... 428/34 |
| 6,216,417 B1 | * | 4/2001 | Morin et al. .................. 428/34 |

OTHER PUBLICATIONS

DORMA–Glas GmbH, "Straight to the point in glass design MANET", 6 pages, 1/97.
DORMA–Glas GmbH, "DORMA Universal", 28 pages, 7/98.
DORMA–Glas GmbH, "DORMA TP/TA", 24 pages, 2/94.
OGRO Beschlagtechnik GmbH, "DORMA TG", 16 pages, 10/98.
"GLASSLAM N.G.I., Inc.", http://glasslam.com/3.htm. Accessed Apr. 27, 2000.

* cited by examiner

Primary Examiner—Carl D. Friedman
Assistant Examiner—Basil Katcheves
(74) Attorney, Agent, or Firm—Hooker & Habib, P.C.

(57) ABSTRACT

A laminated glass panel suitable for use in frameless glass structures includes a sheet of untempered glass such as art glass and can be held by conventional frameless glass mounting hardware. The panel remains held by the mounting hardware should the panel crack.

18 Claims, 4 Drawing Sheets

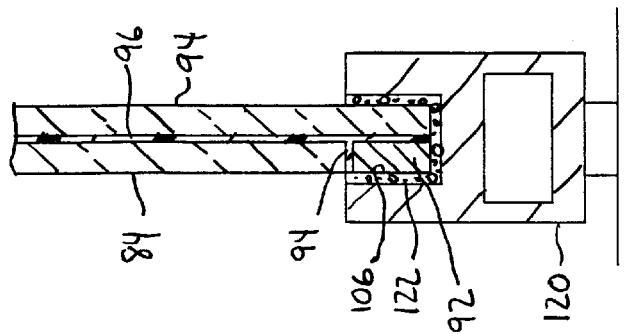
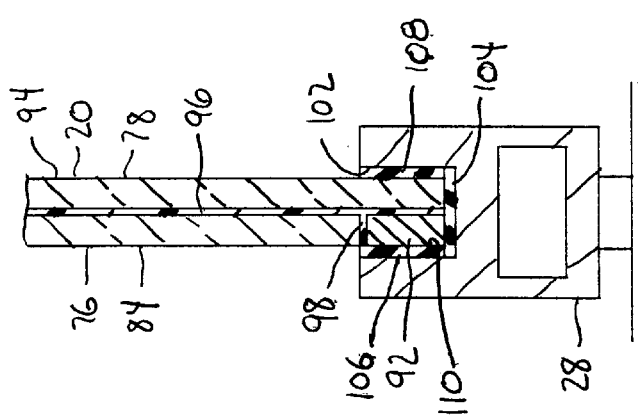
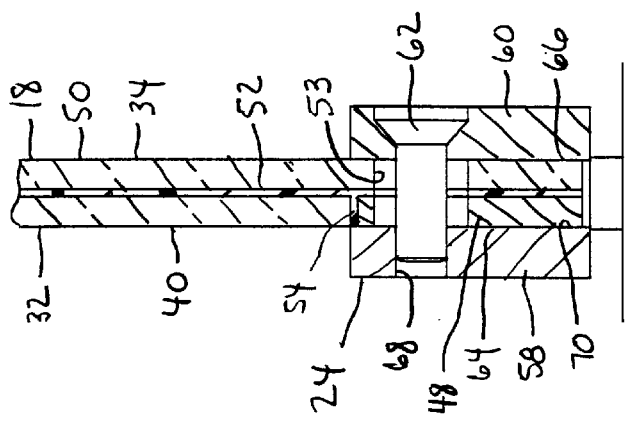
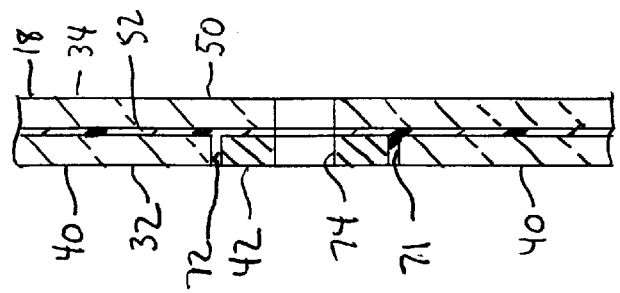

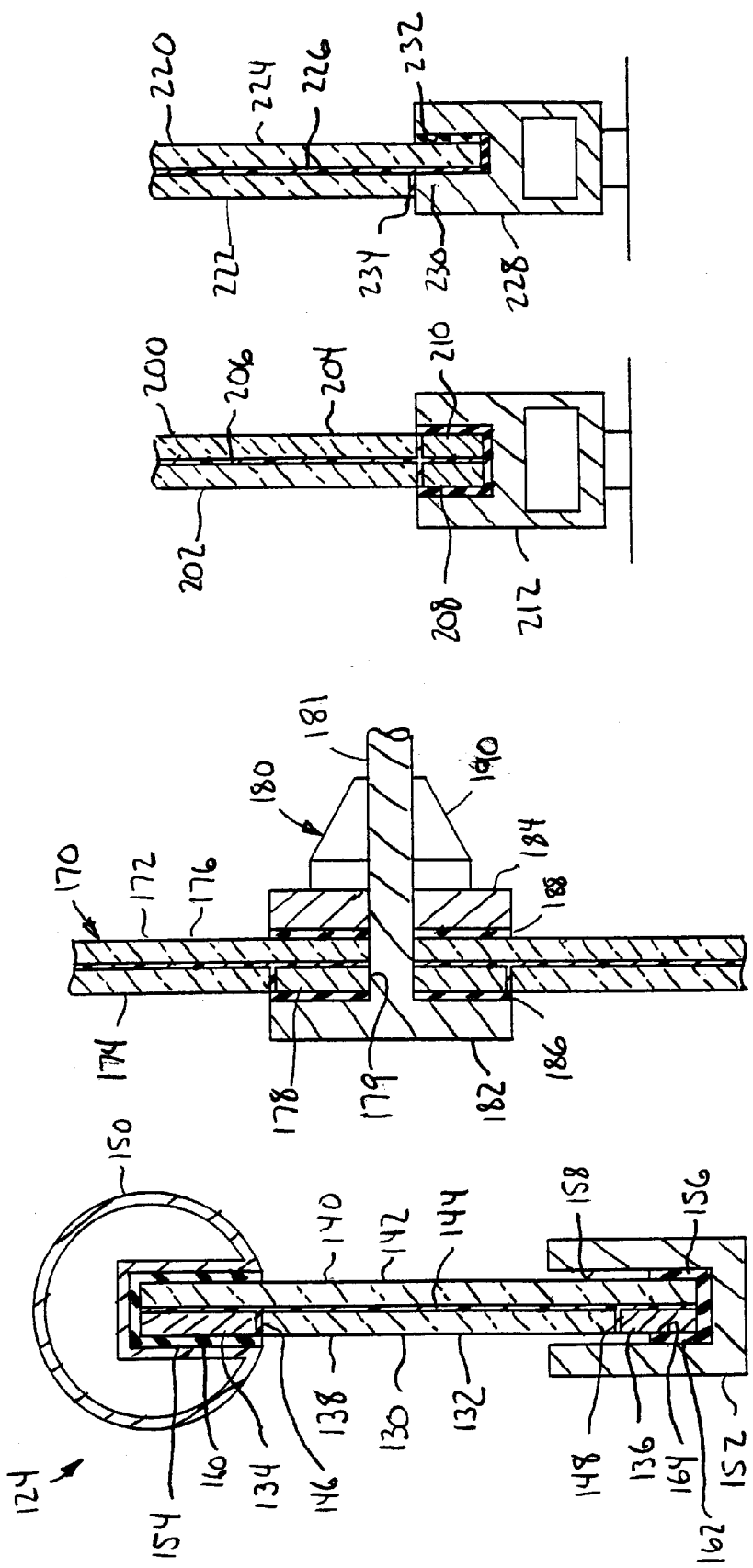

LAMINATED GLASS PANEL

FIELD OF THE INVENTION

The invention relates to a laminated glass panel and particularly to a laminated glass panel suitable for use in frameless glass structures.

BACKGROUND OF THE INVENTION

Frameless glass panels are often used by architects and decorators to define or enclose interior spaces. Typical uses of the panels include doors, partition walls, shower enclosures, glass furniture and glass retail displays. Panels are also known as "lites" in the glass industry.

Conventional frameless panels are supported by mounting hardware that grips or holds both sides of the panel and connects the panel to a supporting member. Such mounting hardware includes patch fittings that generally extend three to six inches along an edge of the panel or rail fittings that extend along an entire edge of the panel. Other auxiliary patch or rail fittings mount handles, railings, and other auxiliary hardware. The fittings do not surround the entire panel, giving the desired appearance of a substantially continuous and largely unobstructed expanse of glass.

Each fitting typically includes a pair of clamp plates or a U-channel that grip the opposite sides of the panel. A fastener may extend between the clamp plates or channel through a hole in the panel to mount the fitting and adjust the force with which the fitting grips the panel.

A conventional panel is either a single sheet of tempered glass or two sheets of tempered glass laminated together by a clear interlayer. The fittings bear directly against the tempered glass to grip the panel. Tempered glass has sufficient strength to withstand the bearing forces applied to it without cracking.

It is preferred for security purposes that the panel be laminated glass rather than a single glass sheet. Tempered glass cracks into a number of small, separate fragments. A cracked panel that is a single sheet of tempered glass cannot be held in place by the fittings. When the glass breaks, the broken fragments fall out of the fittings and an opening in the structure is created. In contrast, a cracked laminated panel remains held in place by the fittings. The interlayer remains bonded to the glass fragments and holds the fragments in place to enable the fittings to hold the cracked panel in place.

Although conventional frameless glass panels are visually appealing, decorative options are generally limited to selecting the fittings used to mount the panels and auxiliary hardware. The tempered glass itself is clear and smooth and limits the visual impact and appeal of the panels.

To increase the decorative options available for frameless glass panels, it is desirable to replace the tempered glass with art glass. Art glass, also known as decorative glass, is a type of float glass commonly used to make stained glass or textured windows.

Art glass is available in a wide variety of colors and surface textures. The molten glass may be handblown and then rolled flat to obtain an uneven surface texture. Alternatively, the glass may be rolled flat on steel plates. The rollers may be smooth or may have a textured surface to impart the texture on the glass surface. The glass may be beveled or cut to form artistic surface designs.

Art glass is not sufficiently strong to be held or gripped by conventional frameless glass fittings. Art glass is untempered and cracks from the forces applied to it by conventional patch or rail fittings.

It is known to bond art glass to one side of a single sheet of tempered glass in a frameless glass structure. The art glass overlies an unobstructed portion of the tempered glass without extending into the areas gripped by the fittings. However, if the tempered glass breaks the art glass cannot be held by the mounting hardware. Such construction cannot be used where security is a concern and is not suitable for most business and retail applications.

In other conventional glass panels a metal frame extends around the outer periphery of the art glass. The frame distributes the load about the outer edges of the art glass and prevents the art glass from cracking. The frame cannot be used where frameless glass structures are desired.

Thus, there is a need for an improved frameless glass panel that includes a sheet of untempered glass such as art glass. The improved panel should be held with conventional frameless glass mounting hardware and should remain held by the mounting hardware if the panel were to crack. In use, the unobstructed glass area of the frameless glass structure should not be reduced.

SUMMARY OF THE INVENTION

The present invention is directed to an improved laminated frameless glass panel. The improved panel includes a sheet of untempered glass such as art glass and can be held with conventional frameless glass mounting hardware. The panel remains held by the mounting hardware should the panel crack. The unobstructed glass area of the installed panel is not reduced.

A laminated panel having features of the present invention includes a sheet of art glass on one side of the panel. One or more rigid bearing members are located on the same side of the panel as the art glass. The art glass and bearing members are bonded together by a laminate interlayer. The bearing members are located in areas of the side that are to be gripped by the mounting hardware. The bearing members may be gripped by the mounting hardware without cracking when the panel is installed in the structure.

Conventional patch or rail fittings may be used to mount the panel in the frameless glass structure. The fittings face the bearing members and do not contact the art glass. The fittings bear against the bearing members and not the art glass. The fittings preferably cover the bearing members such that the unobstructed portion of the improved panel is the same as the unobstructed portion of a conventional tempered glass panel when installed.

In a preferred embodiment, the panel includes a sheet of art glass laminated to a sheet of tempered glass. The tempered glass faces both the art glass and the pressure plates and is itself otherwise conventional.

The bearing members are preferably flat metal pressure plates. Each plate has a thickness equal to the nominal thickness of the art glass. The plates are preferably spaced from the art glass by the interlayer, which fills the gaps between the plates and the art glass. The plates are sized such that the fittings cover the gaps between the plates and the art glass to give the visual impression that the art glass extends into the fittings.

The glass sheets and bearing members may be laminated together using conventional laminating methods. The interlayer may be formed from a conventional curable, flowable resin that bonds to both metal and glass surfaces.

In another embodiment pairs of bearing members overlie each other on opposite sides of the panel. This enables untempered glass to be used on both sides of the panel. In yet another embodiment some or all of the bearing members may form integral portions of the mounting hardware. For example, in possible embodiments a bearing member may be an integral portion of a patch or rail fitting.

Other objects and features of the invention will become apparent as the description proceeds, especially when taken in conjunction with the accompanying drawings illustrating the invention, of which there are four sheets of six embodiments.

BRIEF DESCRIPTION OF THE DRAWINGS

FIG. 5 is similar to FIG. 4 when the panel is mounted in the doorway shown in FIG. 1;

FIG. 6 is a vertical sectional view taken along line 6—6 of FIG. 2;

FIG. 9 is similar to FIG. 8 when the panel is mounted in doorway shown in FIG. 1;

FIG. 10 is similar to FIG. 9 but illustrates a second embodiment rail fitting;

FIG. 11 is a vertical sectional view through a glass hand railing incorporating a third embodiment laminated glass panel of the present invention;

FIG. 12 is a vertical sectional view through a glass wall incorporating a fourth embodiment laminated glass panel of the present invention, a rail holder mounted on the wall;

FIG. 13 is a vertical sectional view similar to FIG. 9 but with a fifth embodiment laminated glass panel; and FIG. 14 is a vertical sectional view similar to FIG. 9 but with a sixth embodiment laminated glass panel.

DESCRIPTION OF THE PREFERRED EMBODIMENT

Figure 1:
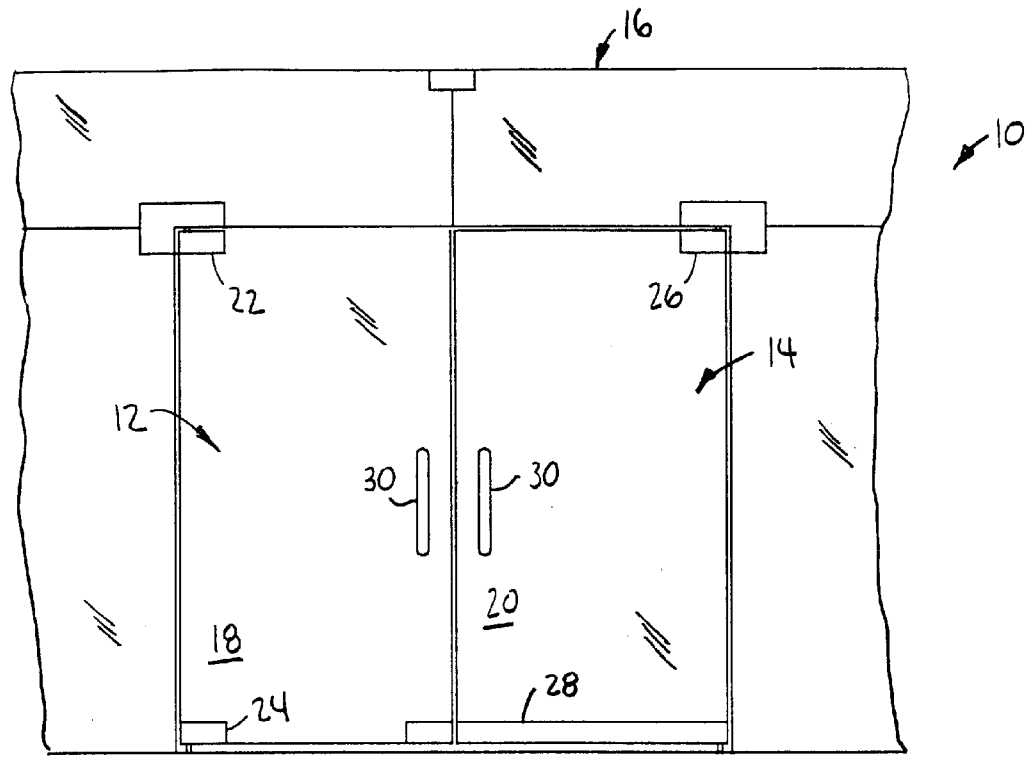
FIG. 1 is a front view illustrating a portion of a frameless glass doorway incorporating two embodiments of the laminated glass panels of the present invention.

FIG. 1 illustrates a frameless glass structure 10 having left and right doors 12, 14 mounted in a doorway of a conventional glass wall 16. The doors 12, 14 include laminated panels 18, 20 in accordance with the present invention.

The doors 12, 14 are pivotally mounted to the floor and glass wall 16 by conventional patch or rail fittings 22–28. The left door 12 is mounted by upper and lower patch fittings 22 and 24. The right door 14 is mounted by upper patch fitting 26 and lower rail fitting 28. A conventional elongate "C" door pull 30 is attached to each door with auxiliary patch fittings (not shown).

Typically the doors 12, 14 would be constructed as mirror images of each other with like fittings. Doors 12 and 14 are shown with different lower fittings 24, 28 for purposes of illustration only.

Figure 2:
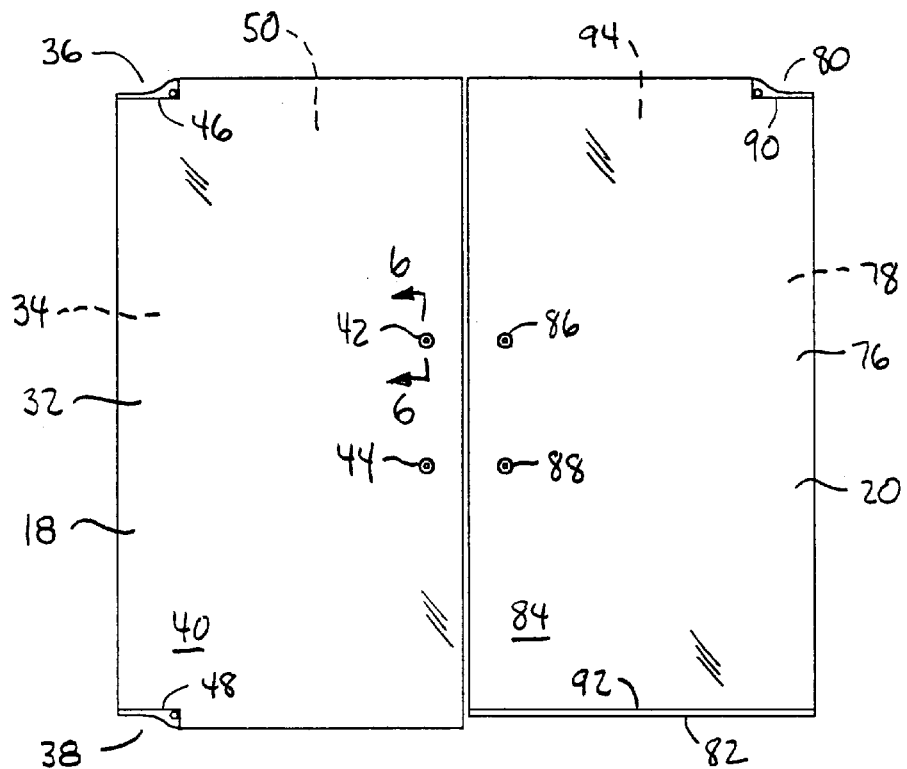
FIG. 2 is a front view of the two laminated glass panels shown in FIG. 1.

FIG. 2 is a front view of panels 18, 20. The panels 18, 20 are differently constructed and sized for installation with the lower patch fitting 24 or the lower rail fitting 28.

Panel 18 has generally rectangular front and rear sides 32, 34 (see FIG. 4) of equal size. Cutout areas 36, 38 provide space for conventional door spindle inserts (not shown) held by the patch fittings 22 and 24.

Panel 18 includes a sheet of art glass 40 and four rigid metal pressure plates 42–48 on the front side 32. The pressure plates are located in the areas of the front side that are gripped by the patch fittings when the door 12 is mounted in wall 16 as described below. Pressure plates 42 and 44 are located in the areas of the front side gripped by the auxiliary patch fittings that mount the ends of the door handle. Pressure plates 46 and 48 are located in the areas of the front side gripped by the upper and lower patch fittings 22 and 24 respectively.

A single sheet 50 of tempered glass on the rear side 34 faces the entire front side 32 of the panel and overlies the art glass 40 and the pressure plates. Sandwiched between both sides of the panel 12 is a clear plastic interlayer 52 (see FIG. 4). The interlayer 52 bonds to the art glass 40, the pressure plates 42–48 and the tempered glass 50 to bond the front and rear sides of the panel 18 together.

Figure 3:
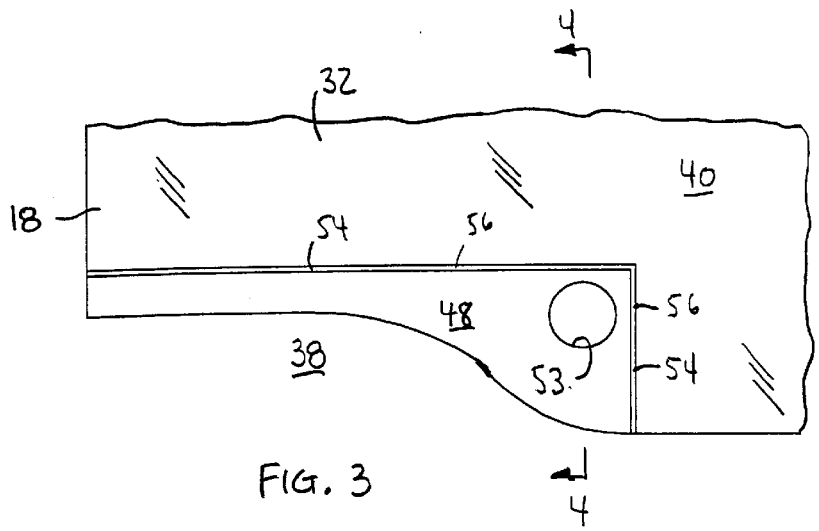
FIG. 3 is a partial view of the lower left corner of the left hand panel shown in FIG. 2.

FIG. 3 illustrates a portion of panel 18 in the area of pressure plate 48. The pressure plate 48 is adjacent the cutout area 38 and is shaped to conform to the cutout area 38 required by the patch fitting 24. A through-hole 53 extends through the pressure plate, the interlayer and the tempered glass to receive a fastener that is a component of the patch fitting 24. The portion of the panel 18 in the area of pressure plate 46 is similarly constructed.

The pressure plate 48 is spaced away from the art glass 40 with the sides of the art glass and the pressure plate defining a space or gap 54 between them. The gap 54 enables the pressure plate 46 to differentially expand or contract with respect to the art glass 40 with room temperature changes.

The width of the gap 54 is preferably about equal to the thickness of the interlayer 52, typically about one-sixteenth of an inch. The interlayer 52 includes a gap-filling portion 56 that fills the gap 54 and forms a portion of the front side of the panel 18. The interlayer portion 56 bonds to the sides of the art glass and pressure plate facing the gap. The interlayer portion 56 helps distribute any forces transferred between the art glass and the pressure plate and resists undesirable localized concentrations of force from being transferred to the art glass.

Figure 4:
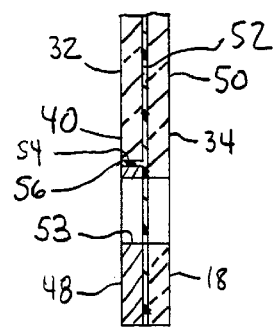
FIG. 4 is a vertical sectional view taken along line 4—4 of FIG. 3.

As shown in FIG. 4, the thicknesses of the pressure plate 48 and the art glass 40 are about equal. The outer faces of the art glass 40 and the pressure plate 48 are substantially level with each other to form a smooth, planar face. This gives the visual impression that the art glass 40 extends into the patch fitting 24 when the panel is held in the fitting.

The thickness of the panel 18 in the areas of the pressure plates is the same as a conventional laminated panel so that commercially available fittings may be used to mount the panel 18 in the wall 16.

FIG. 5 is similar to FIG. 4 but illustrates the panel 18 when installed in wall 16. A portion of the panel 18 is gripped by the lower patch fitting 24. The patch fitting 24 includes front and rear clamp plates 58 and 60 that clamp or grip the panel 18 between them and a threaded fastener 62 that adjusts the clamping force. Each clamp plate 58, 60 has a flat bearing surface 64, 66 that engages the front or rear side of the panel 18. The fastener 62 extends through one clamp plate, through the hole 53 and threads into a threaded bore 68 in the other clamp plate to force the clamp plates together against the panel 18.

The front clamp plate 58 engages the front side 32 of the panel 18. The clamp plate 58 faces the pressure plate 48 and the gap 54. The clamp plate 58 bears against an outer facing bearing surface 70 of the pressure plate 48 but does not contact or bear against the art glass 40. The pressure plate 48 is sized such that the clamp plate 58 extends beyond the pressure plate to cover the gap 54 from view so that the art glass appears to extend into the patch fitting. The rear clamp plate 60 bears directly against the tempered glass 50 in a conventional manner. When installed, the unobstructed portion of the panel 18 is the same as a conventional panel.

Should either glass sheet 40, 50 crack, the panel 18 will remain held in the patch fitting 24. The plastic interlayer 52 is gripped between the clamp plates 58, 60 and would remain held by the plates should the glass crack. The interlayer 52 is bonded to the glass and prevents the cracked glass from falling away from the panel 18.

FIG. 6 is a cross-section of the panel 18 through the pressure plate 42. The pressure plate 42 is a circular plate located in a larger diameter hole 71 in the interior of the art glass 40. The art glass entirely surrounds the pressure plate 42. A gap-filling portion 72 of the interlayer 52 fills the gap between the pressure plate 42 and the art glass. A through hole 74 extends through the pressure plate 42 and the tempered glass 50 to receive a fastener (not shown) of an auxiliary patch fitting.

Construction of panel 20 is similar to panel 18. Panel 20 has generally rectangular front and rear sides 76, 78 that are of equal size and a cutout area 80 similar to cutout area 36. See FIG. 2. The bottom edge 82 of the panel 20 is straight to be received within lower rail fitting 28. A sheet of art glass 84 and four metal pressure plates 86–92 are on the front side 76 of the panel 20. A pane of tempered glass 94 forms the rear side 78 of the panel 20 and faces the art glass and the pressure plates. Sandwiched between both sides of the panel 20 is a clear plastic interlayer 96 like the interlayer 52 (see FIG. 8). Pressure plates 86 and 88 are like pressure plates 42 and 44 for being gripped by an auxiliary patch fitting that mounts the door handle 30. Pressure plate 90 is similar to pressure plate 46 to be gripped by upper patch fitting 26.

Figure 7:
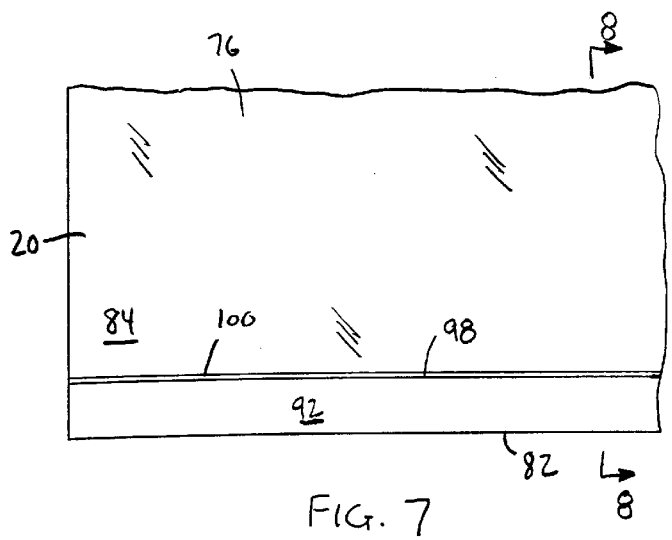
FIG. 7 is a partial view of the lower left corner of the right hand panel shown in FIG. 2.
Figure 8:
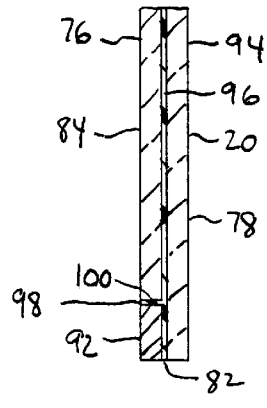
FIG. 8 is a vertical sectional view taken along line 8—8 of FIG. 7.

FIGS. 7 and 8 illustrate a portion of panel 20 in the area of the pressure plate 92. The pressure plate 92 extends along the entire bottom edge 82 of the front side of the panel 20 in the area to be gripped by the lower rail fitting 28. A gap 98 extends between the pressure plate 92 and the art glass 84. A gap-filling portion 100 of the interlayer 96, similar to the interlayer portion 56, fills the gap between the plate 92 and the art glass 84.

FIG. 9 is similar to FIG. 8 but illustrates the panel 20 when installed in wall 16. The bottom of the panel 20 is gripped by the lower rail fitting 28. The rail fitting 28 includes a U-channel 102 that receives the panel 20. A resilient bottom insert 104 and front and rear inserts 106, 108 extend along the insides of the channel. The bottom of the panel 20 rests on the bottom insert 104. The front and rear inserts 106, 108 bear against the panel 20 to grip the panel 20 within the channel 102.

The front insert 106 bears against the front side 76 of the panel 20. The front insert 106 faces the pressure plate 92 and the gap 98. The insert 106 bears against an outer bearing surface 110 of the pressure plate 92 and does not bear against the art glass 84. The pressure plate 92 is sized such that the front insert 106 extends beyond the plate 92 to hide from view the gap 98. The rear insert 108 bears directly against the tempered glass 94 in a conventional manner.

FIG. 10 is similar to FIG. 9 but illustrates a second embodiment rail fitting 120 similar to rail fitting 28. The resilient inserts are replaced by a cement interlayer 122 that hardens in place after the panel 20 is inserted in the rail channel. The cement bears against the bearing surface 110 of the pressure plate 92 and covers the gap 98 but does not contact the art glass.

FIG. 11 illustrates a cross section through a glass hand railing 124 incorporating a laminated glass panel 130 of the present invention. Construction of the panel 130 is similar to panels 18 and 20. A sheet of art glass 132 and two metal pressure plates 134 and 136 are on the front side 138 of the panel 130. The pressure plates extend along the upper and lower edges of the art glass and are spaced away from the art glass as shown. A sheet of tempered glass 140 forms the rear side 142 of the panel 130 and faces the art glass and the pressure plates. Sandwiched between the sides of the panel 130 is a bonding interlayer 144 that also fills the gaps 146, 148 between the art glass and the pressure plates.

The railing 124 includes an upper railing cap 150 and a lower shoe molding 152. A resilient insert 154 grips the upper end of the panel 130 to hold the panel in the cap. A resilient setting block 156 supports and centers the panel 130 in a U-channel 158 in the shoe molding. The setting block 156 spaces the sides of the panel 130 from the sides of the channel. The front leg 160 of the insert 154 bears against the upper pressure plate 134 and does not contact the art glass 132. The front leg 162 of the setting block 156 engages an outer bearing surface 164 of the lower pressure plate 136. The pressure plate 136 extends above the setting block 156. The gap 148 between the lower pressure plate 136 and the art glass 132 is above the setting block but is hidden from view by the shoe molding 152.

FIG. 12 illustrates a cross section through a glass wall 170 incorporating another panel 172 in accordance with the present invention. Construction of the panel is similar to panels 18 and 20 with a sheet of art glass 174 on one side of the wall and a sheet of tempered glass 176 on the other side of the wall. A circular pressure plate 178 is surrounded by and spaced from the art glass 174. A through hole 179 extends through the pressure plate 178 and the tempered glass 176 to receive the shaft 181 of a conventional auxiliary patch fitting 180 for mounting a handrail (not shown). The fitting 180 grips the panel 172 between a fixed clamp plate 182 and a movable clamp plate 184. Annular resiliant pads 186, 188 are located on the shaft between each clamp plate and the panel. The pad 186 covers the gap between the pressure plate and the art glass. A press member 190 movable along the shaft presses the movable clamp plate against the panel and is held in place on the shaft 181 by a setscrew (not shown). The clamp plate 182 bears against the pressure plate and does not contact the art glass.

FIG. 13 illustrates another embodiment panel 200 in accordance with the present invention. The panel 200 includes two sheets of art glass 202, 204 bonded together by a plastic interlayer 206. Pairs of facing pressure plates 208, 210 are located on both sides of the panel. FIG. 13 shows the panel held in a conventional lower rail fitting 212 with the pressure plates 208, 210 being gripped by the rail fitting 212. Because the rail fitting does not bear against the glass, art glass may be used on both sides of the panel 200.

FIG. 14 illustrates yet another embodiment panel 220 in accordance with the present invention. The panel 220 includes a sheet of art glass 222 bonded to a sheet of tempered glass 224 by interlayer 226. The panel is shown held in a conventional lower rail fitting 228. A pressure plate 230 spaced from the art glass 222 is bonded to the interlayer 226 and is gripped in the U-channel 232 of the rail fitting. However, in this embodiment the pressure plate 230 is an integral, undivided portion of the rail fitting 228. In other embodiments the pressure plates may be integral portions of patch fitting clamp plates. In yet other embodiments a panel may include a mix of pressure plates, some integral with the fittings and others non-integral with the fittings.

The rail fitting 228 shown in FIG. 14 does not cover the gap 234 between the pressure plate 230 integral with rail fitting 228 and the art glass 202. If desired in other embodiments the cover of the rail fitting could include a lip or extension that covers the gap.

Fabrication of laminated panels having tempered glass in accordance with the present invention will now be described. The type, number and location of. fittings to mount the panel in the glass structure is generally known in advance. The configuration of any cutout areas, the size of the clamp plates or channels and the size of required through-holes required to accommodate the fittings are specified by the fittings manufacturer. With this information the desired size and shape of the glass sheets and pressure plates can be determined in advance of fabrication.

Tempered glass cannot be cut or drilled without cracking the glass. The sheet of tempered glass is provided by the glass manufacturer in the desired final shape and with the required holes in place, the same as in the construction of a conventional laminated panel.

Art glass is typically provided as rectangular sheets. The sheet is cut to the desired shape. Cutout areas are cut away from the glass and any through holes are drilled. Art glass, being an untempered glass, can be readily cut or drilled using conventional glass cutting techniques. The sheet of tempered glass can be used as a template to locate holes and cutout areas. Portions of the art glass that would otherwise contact the fittings are removed to accommodate the pressure plates.

The pressure plates are spaced away from the art glass as previously described and, if desired, sized such that the fittings will overlap an otherwise visible gap between the art glass and the pressure plate. Alternatively, the pressure plates may be sized to make visible the gap between the art glass and the pressure plates or the pressure plates could extend outwardly of the fittings for different visual effects.

The art glass, pressure plates and tempered glass are laminated together using conventional methods. The thickness of the interlayer is preferably the same as a conventional laminated tempered glass panel. The art glass may have an uneven, decorative surface texture on both sides of the glass. The interlayer is formed from a curable, flowable resin that makes intimate contact with the glass sheets and pressure plates and cures without voids. Suitable resins that bond to both glass and metal include a liquid polyester based polymer resin manufactured known as "GLASSLAM LAMINATING SYSTEM" by Glasslam NGI, Inc., Pompano Beach, Fla. and equivalents.

Fabrication of a laminated panel like panel 220 having two sheets of art glass is similar to that of the panel described above, with the steps necessary to fabricate the art glass and pressure plates repeated for the second face of the panel.

Although the embodiments shown include art glass, it should be understood that other types of untempered glass may be substituted for the art glass. Other types of toughened, crack-resistant glass may also be substituted for the untempered glass if such glass can be directly engaged by the fittings.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A laminated glass panel suitable for a frameless glass structure of the type wherein a patch fitting grips the sides of the panel, the panel comprising:

a first layer on one side of the panel, a second layer on the other side of the panel, the second layer spaced from the first layer and defining a gap between the layers, and an interlayer completely filling the gap between the first and second layers;

the first layer comprising a first sheet of untempered float glass and a rigid bearing member, the bearing member comprising an outwardly facing bearing surface to face a patch fitting;

the second layer comprising a second sheet of crack-resistant glass, the second sheet overlying the first sheet and the bearing member, the portion of the second sheet of glass overlying the bearing member comprising an outwardly facing surface to face a patch fitting; and the interlayer adhering to the first and second sheets of glass and the bearing member to bond the first and second layers of the panel together;

wherein should either glass sheet crack, the adhesion of the interlayer resists the falling away of cracked glass or the bearing member from the panel.

2. The laminated panel of claim 1 wherein the bearing member comprises a metal plate.

3. The laminated panel of claim 2 wherein the bearing surface of the bearing member is substantially level with the outer surface of the sheet of float glass.

4. The laminated panel of claim 1 including a space between the bearing member and the float glass, the interlayer filling the space between the bearing member and the float glass.

5. The laminated panel of claim 1 wherein the bearing member is completely surrounded by the first sheet of glass.

6. The laminated panel of claim 1 wherein the panel comprises an edge extending the thickness of the panel from the first layer to the second layer, and the bearing member is located along the edge of the panel.

7. The laminated panel of claim 1 comprising a through bore extending through the thickness of the panel, the bore having an end opening in the bearing member and an opposite end opening in the second sheet of glass to receive a through-member of the patch fitting.

8. A laminated glass panel for use in a frameless glass structure, the panel comprising:

a first layer on one side of the panel, a second layer on the opposite side of the panel, and a plastic interlayer sandwiched between and separating the first and second layers;

the first layer comprising an untempered first sheet of glass and a rigid bearing member, the first sheet and the bearing member each comprising an inner surface facing the interlayer, the inner surface bounded by the periphery of such first sheet or bearing member;

the second layer comprising a second sheet of glass facing the first sheet of glass and comprising an inner surface facing the interlayer, the inner surface bounded by the periphery of the second sheet; and the plastic interlayer contacting and adhering to the inner surfaces of the first and second glass sheets and the bearing member to bond the panel layers together and to resist falling away of the glass or bearing member from the panel should either glass sheet crack.

9. The laminated panel of claim 8 comprising a gap between the bearing member and the first sheet of glass.

10. The laminated panel of claim 9 wherein the interlayer extends into the gap and adheres to the bearing member and first sheet of glass facing the gap.

11. The laminated panel of claim 8 wherein the second layer comprises an additional rigid bearing member, the additional bearing member overlies the bearing member on the first side of the panel and the interlayer bonds to the additional bearing member.

12. The laminated panel of claim 8 wherein the first sheet of glass and the bearing member have substantially the same thickness.

13. The laminated glass panel of claim 8 wherein the bearing member is an integral portion of one of a patch fitting and a rail fitting.

14. The laminated glass panel of claim 8 wherein the untempered sheet of glass comprises art glass having a non-flat or textured outer surface.

15. The laminated glass panel of claim 8 wherein the second sheet of glass is tempered glass.

16. The laminated glass panel of claim 8 further comprising an axially aligned through-bore extending through the bearing member, the interlayer, and the second layer of the panel for receiving a structural support member therein.

17. The laminated glass panel of claim 8 wherein the plastic interlayer comprises a liquid resin cured in place between the first and second layers.

18. A frameless glass structure comprising a laminated panel as in claim 8.

* * * * *